United States Patent
Winograd

(10) Patent No.: US 10,347,056 B2
(45) Date of Patent: Jul. 9, 2019

(54) APPARATUS AND METHOD FOR MONITORING VEHICLE ON/OFF STATE

(71) Applicant: Connected Holdings, LLC, Newport Beach, CA (US)

(72) Inventor: Gil Winograd, Aliso Viejo, CA (US)

(73) Assignee: Connected Holdings, LLC, Newport Beach, CA (US)

( * ) Notice: Subject to any disclaimer, the term of this patent is extended or adjusted under 35 U.S.C. 154(b) by 109 days.

(21) Appl. No.: 15/488,718

(22) Filed: Apr. 17, 2017

(65) Prior Publication Data

US 2018/0300967 A1    Oct. 18, 2018

(51) Int. Cl.
G07C 5/02    (2006.01)
G07C 5/00    (2006.01)
H04W 4/48    (2018.01)
G01S 19/13    (2010.01)

(52) U.S. Cl.
CPC ............. *G07C 5/02* (2013.01); *G07C 5/006* (2013.01); *G07C 5/008* (2013.01); *H04W 4/48* (2018.02); *G01S 19/13* (2013.01)

(58) Field of Classification Search
CPC .......... G07C 5/02; G07C 5/008; G07C 5/006; G01S 19/13; H04W 4/046
See application file for complete search history.

(56) References Cited

U.S. PATENT DOCUMENTS

| 6,493,401 B1 | 12/2002 | Erckert |
| 8,744,667 B2 | 6/2014 | Morand |
| 9,082,242 B2 | 7/2015 | Cicala et al. |
| 2008/0255722 A1* | 10/2008 | McClellan ............ B60R 25/102 701/31.4 |
| 2008/0262670 A1* | 10/2008 | McClellan ............ G01S 5/0027 701/31.4 |
| 2009/0051510 A1* | 2/2009 | Follmer ................ G07C 5/008 340/425.5 |
| 2009/0088910 A1* | 4/2009 | Yi ........................... H04L 12/12 701/1 |

(Continued)

OTHER PUBLICATIONS

Webpage: International Organization for Standardization: Great things happen when the world agrees; ISO 11898-5:2007; publication date Jun. 2007; https://www.iso.org/standard/41284.html.

*Primary Examiner* — Mussa A Shaawat
(74) *Attorney, Agent, or Firm* — Luedeka Neely Group, P.C.

(57) ABSTRACT

The presence of a powered CAN bus is a good indicator of whether an aftermarket telematics device powered by a vehicle OBD port should enter a low-power mode to prevent unwanted battery drain, as the vehicle will remove power from the CAN bus when it determines the vehicle is not in use. Circuitry in the telematics device monitors the voltage on the CAN bus wires of the OBD port to determine whether the CAN voltage is above or below some threshold, such as 1V. This enables the vehicle ON/OFF status to be determined reliably without any additional wiring in the vehicle. The circuitry may include a simple, inexpensive, and low-power integrated circuit comparator, an operational amplifier, or an ADC to determine whether the vehicle is ON or OFF based on the CAN voltage. A very simple embodiment uses a single MOSFET and resistor to detect the vehicle ON/OFF state.

21 Claims, 3 Drawing Sheets

(56) References Cited

U.S. PATENT DOCUMENTS

| | | | |
|---|---|---|---|
| 2010/0106351 A1* | 4/2010 | Hanssen | B60K 6/48 701/22 |
| 2012/0203441 A1* | 8/2012 | Higgins | G07C 5/008 701/102 |
| 2013/0079952 A1* | 3/2013 | Fazi | F02D 45/00 701/2 |
| 2015/0097525 A1* | 4/2015 | DeDona | B60L 11/1838 320/109 |
| 2015/0097527 A1* | 4/2015 | DeDona | B60L 11/1818 320/109 |
| 2015/0192983 A1 | 7/2015 | Rennig | |
| 2015/0346260 A1 | 12/2015 | Jiang et al. | |
| 2016/0178683 A1 | 6/2016 | Ramey et al. | |
| 2016/0236615 A1 | 8/2016 | Kajimoto et al. | |
| 2017/0161965 A1* | 6/2017 | Du | G06F 17/5009 |

* cited by examiner

APPARATUS AND METHOD FOR MONITORING VEHICLE ON/OFF STATE

FIELD

This invention relates to the field of vehicle monitoring. More particularly, this invention relates to a system for monitoring a vehicle communication bus to determine ON/OFF status of the vehicle.

BACKGROUND

Many aftermarket automotive telematics devices plug into a vehicle's onboard diagnostics (OBD) port, because this port is quite standard across a large variety of vehicle make/model/year. The OBD port conveniently provides power and ground connections that are used to power the telematics device. In some cases, the telematics device may be plugged into the front side of the OBD port, i.e. into the connector socket that faces into the passenger compartment. In this case, it is easy and convenient for an end user to install or un-install the telematics device.

In other cases, the aftermarket telematics device may plug into the backside of the OBD port, which may be behind or under the dashboard. This can be done most conveniently with a T-harness. As delivered from the factory, vehicles typically have a cable with a standard OBD connector that connects to the vehicle OBD port. If this cable is unplugged, the T-harness can then be inserted between this cable and the OBD port, and the telematics device can be connected to the secondary leg of the T-harness. This type of installation is very convenient because it is standard across a large variety of vehicle make/model/year and does not require additional wiring or wire splicing to any other part of the vehicle. This type of installation can also mitigate the possibility of a vehicle warranty violation.

Some telematics devices that monitor functions of heavy-duty vehicles are designed to receive power from a J-Bus port. The J-Bus serves generally the same purpose in heavy-duty vehicles as does the OBD port in passenger vehicles.

While the OBD and J-Bus ports conveniently provide power to the aftermarket telematics device, this power is "always-on" (supplied by the vehicle battery), even when the vehicle ignition is OFF. As such, the telematics device should be designed to minimize the power usage so as not to excessively drain the vehicle battery when the ignition is OFF. This is typically done by including enough intelligence in the telematics device to operate in a special "low-power" mode, or even turn off completely, when the ignition is OFF. However, the OBD and J-Bus ports do not provide a standard power status signal or switched-power from which the telematics device can ascertain whether the ignition is ON or OFF.

Various inconvenient or unreliable methods have been used in prior aftermarket telematics devices to enable and disable low-power modes. One such method is to wire an actual signal from elsewhere in the vehicle that indicates the ignition status of the vehicle. This defeats the convenience of the OBD and J-Bus port installation as it requires separate wiring (and possibly splicing) that is different on each vehicle. Another possible method is to monitor the voltage on the OBD or J-Bus power port, as often this voltage will be higher than the battery voltage when the vehicle's alternator is running. This method is unreliable.

What is needed, therefore, is a reliable technique for using one or more signals in the OBD or J-Bus port of a vehicle to determine the ON/OFF status of the vehicle.

SUMMARY

Most OBD ports on vehicles manufactured after about 2007 provide a connection to a Controller Area Network (CAN) bus on two standardized pins of the OBD port. All J-BUS ports that support the J1939 standard also provide the CAN bus. The CAN bus can be queried to read the Vehicle Identification Number (VIN), engine diagnostics codes, and possibly additional information about the engine and the vehicle. When the vehicle is OFF, the CAN bus is normally unpowered (i.e. the two signal lines will be at a low level of less than 1V). When the vehicle is ON, the CAN bus is powered. Pursuant to the CAN bus standard protocol, the two CAN bus signals (CAN-H and CAN-L) are in the range 1.5V-3.5V when the vehicle is ON.

Embodiments of the invention described herein monitor the voltage on either one or both of the CAN bus signal wires and determine whether the voltage is above or below some determining threshold, such as 1V. This enables the vehicle ON/OFF status to be determined reliably without any additional wiring. Preferred embodiments use a simple, inexpensive, and low-power integrated circuit Comparator, OpAmp, or Analog-to-Digital Converter to determine whether the vehicle is ON or OFF. A very simple embodiment uses a single MOSFET and resistor to detect the vehicle ON/OFF state.

For many newer "green" vehicles, such as hybrid-electric vehicles or gasoline vehicles that automatically stop the engine whenever the vehicle is stopped, the precise definition of the vehicle being "ON" or "OFF" is not so straightforward. Nevertheless, even for many of these types of vehicles, the presence of a powered CAN bus is a very good indicator of whether an aftermarket telematics device should enter a low-power mode, as the vehicle itself will remove power from the CAN bus when it determines the vehicle is not in use. For example, some vehicles will power the CAN bus when the key-fob is detected to be near the car, and remove power when the key-fob is no longer detected.

Some preferred embodiments described herein provide an apparatus, such as an aftermarket telematics device, that electrically connects to a vehicle diagnostic port of a vehicle, such as the OBD port, to receive electrical power therefrom for powering functional components of the apparatus. The apparatus includes a detector circuit, a processor and a power controller. In some embodiments, the processor and power controller are implemented as one device. The detector circuit receives a Controller Area Network (CAN) signal from the vehicle diagnostic port and generates a detector output signal based on the voltage amplitude of the CAN signal. The processor receives the detector output signal and generates power control signals based on the detector output signal. The power controller receives the electrical power from the vehicle diagnostic port, receives the power control signals from the processor, and controls the electrical power provided to the functional components of the apparatus based on the power control signals.

In some embodiments, the detector circuit includes a comparator that receives the CAN signal on a first comparator input, receives a threshold voltage on a second comparator input, and generates the detector output signal based on whether the voltage amplitude of the CAN signal is greater than the threshold voltage.

In some embodiments, the detector circuit includes an analog-to-digital converter that generates the detector output signal as a digital version of the CAN signal. The processor generates the power control signal based on whether the digital version of the CAN signal is greater in amplitude than a digital version of a threshold voltage.

In some embodiments, the detector circuit includes a CAN transceiver that generates the detector output signal as indicating whether or not the Controller Area Network is operational.

As one of ordinary skill in the art will appreciate, GPIO (General Purpose Input/Output) refers to a standard pin available on most microcontrollers and processors that provides for detection of whether an input is HIGH (1) or LOW (0). Typically, the high and low thresholds are based on a percentage of the power supply voltage going into the chip. For example, if the chip is powered by 3.3V and the threshold is 30/70, then anything less than 30%×3.3V=1V will be detected as LOW, while anything higher than 70%× 3.3V=2.3V will be detected as HIGH. (Anything may read arbitrarily as LOW or HIGH).

In some embodiments, the detector circuit includes an NFET device having a gate connected to the CAN signal, a drain connected to a supply voltage through a first resistor, and a source connected to ground. The voltage level at the drain depends on the voltage amplitude of the CAN signal at the gate. A GPIO input of a microcontroller is connected to the drain of the NFET device. The microcontroller generates the detector output signal based on the voltage level at the drain.

In some embodiments, the detector circuit includes a microcontroller having a GPIO input connected to the CAN signal. The microcontroller generates the detector output signal based on a voltage level at the GPIO input.

In some embodiments in which the apparatus is an aftermarket telematics device, the functional components may include a GPS module, a motion sensor, a wireless data transceiver, and related software.

In another aspect, embodiments described herein provide a method for controlling power to functional components of an apparatus that receives power from a vehicle diagnostic port of a vehicle. The method includes the following steps:
  (a) monitoring a Controller Area Network (CAN) signal from the vehicle diagnostic port;
  (b) comparing the voltage amplitude of the CAN signal to a threshold voltage, wherein the voltage amplitude of the CAN signal is an analog voltage value or digital voltage value;
  (c) providing power or increasing power to the functional components if the voltage amplitude of the CAN signal is greater than the threshold voltage; and
  (d) removing power or reducing power to the functional components if the voltage amplitude of the CAN signal is less than the threshold voltage.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
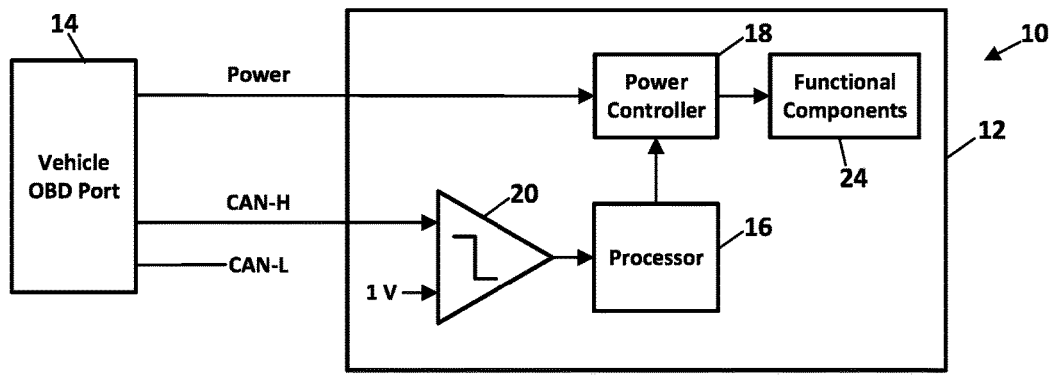
FIG. 1 depicts an apparatus for monitoring a vehicle communication bus to determine ON/OFF status of the vehicle according to a first embodiment.

FIGS. 1-5 depict various embodiments of a system 10 for monitoring a vehicle's OBD port 14 to ascertain whether the vehicle is ON or OFF. When it is determined that the vehicle is OFF, a device 12 that is powered by the OBD port is put into a low-power state to prevent draining the vehicle battery. Preferred embodiments of the device 12 include a detector 20 that monitors the CAN bus on the OBD port to determine the ON/OFF status of the vehicle.

In general, when the vehicle is ON, the CAN-H signal voltage will be in the range 2.0V-2.5V and the CAN-L signal voltage will be in the range 1.5V-2.0V. When the vehicle is OFF, the CAN-H and CAN-L voltages will both be less than 1V, and probably close to or at 0V. For purposes of determining the ON/OFF status of the vehicle, either of the CAN signals may be used in the various embodiments described herein, although the CAN-H signal is used in preferred embodiments.

The device 12 may be an aftermarket telematics device that monitors the location of the vehicle using GPS and reports the location via a wireless data network. Alternatively, the device 12 may monitor the vehicle's malfunction indicator lamp (MIL) and diagnostic trouble codes (DTC) and report their status over a cellular network. Such a device may include a CAN transceiver, and may implement the CAN detection circuit depicted in FIG. 4 to turn off the CAN transceiver when there is no CAN signal available. The device 12 could also be an electronic logging device (ELD) that connects to the J-Bus of a heavy-duty tractor-trailer vehicle to automatically keep track of Hours-of-Service, in accordance with regulations issued by the Federal Motor Carrier Safety Administration (FMCSA).

In the embodiment of FIG. 1, the detector 20 comprises a comparator circuit that compares the CAN high signal (CAN-H) to a voltage threshold, e.g. 1V. When the CAN-H signal is greater than 1V, the output of the comparator is high, and when the CAN-H signal is less than 1V, the output of the comparator is low. A processor 16 monitors the output of the comparator and generates instructions for a power controller circuit 18 based thereon. The power controller 18 turns on or off various functional hardware components or software components 24 of the device 12, so as to reduce the power consumption when the vehicle is OFF and to return to normal/full power mode when the vehicle is ON. The hardware components or software components 24 of the device 12 may be associated with a GPS module, a motion sensor, a wireless data transceiver, or other such components that require power when the device 12 is in operation.

It will be appreciated that the power controller 18 may be component/chip that is separate from the processor 16. Alternatively, the power controller 18 may comprise power management software that is executed by the processor 16.

In the embodiment of FIG. 1, the output of the comparator 20 is a low/high binary signal. As such, in an alternative embodiment, the output of the comparator 20 could be provided directly to the power controller 18, thereby rendering a separate processor unnecessary for power control.

Figure 2:
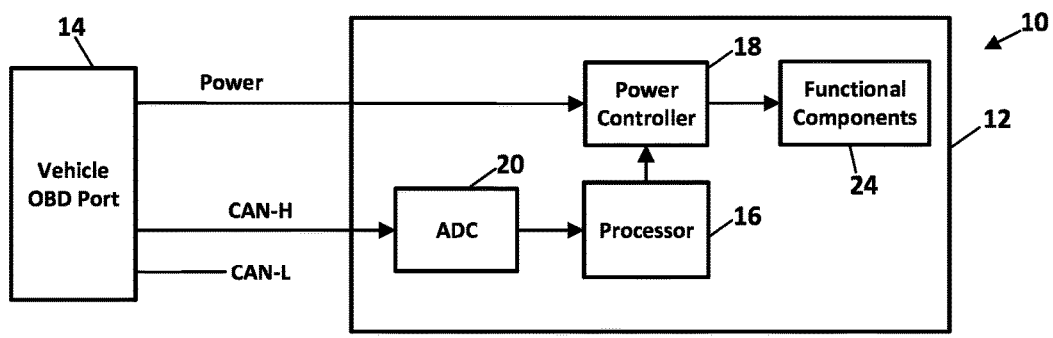
FIG. 2 depicts an apparatus for monitoring a vehicle communication bus to determine ON/OFF status of the vehicle according to a second embodiment.

In the embodiment of FIG. 2, the detector 20 comprises an analog-to-digital converter (ADC) that samples the CAN-H signal to generate a digital version thereof. The processor 16 compares the digital CAN-H signal to a digital value that corresponds to a threshold voltage, such as 1V, and generates instructions for the power controller circuit 18 in the same manner as described above.

Figure 3:
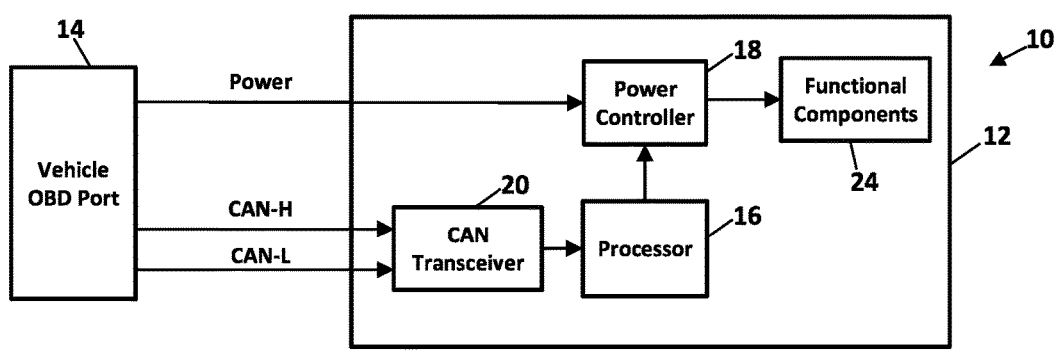
FIG. 3 depicts an apparatus for monitoring a vehicle communication bus to determine ON/OFF status of the vehicle according to a third embodiment.

In the embodiment of FIG. 3, the detector 20 comprises a CAN transceiver, such as the model SN65HVD235-Q1 manufactured by Texas Instruments, which generates an output indicating whether or not the CAN bus is available. Based on the output from the CAN transceiver, the processor 16 generates instructions for the power controller circuit 18 in the same manner as described above.

In each of the embodiments described above, the detector 20 (i.e. comparator, ADC, or CAN transceiver) may be embedded directly into a microcontroller or other digital processor chip.

Those skilled in the art will appreciate that although some embodiments described herein use a CAN transceiver to detect the ON/OFF status of the vehicle (FIG. 3), these and other embodiments are designed to operate in situations in which no communications over the CAN bus are needed. Thus, various embodiments described herein monitor the CAN bus to determine the ON/OFF status of the vehicle without implementing data communication over the CAN bus, thereby significantly simplifying the bus monitoring circuitry and reducing its cost.

Figure 4:
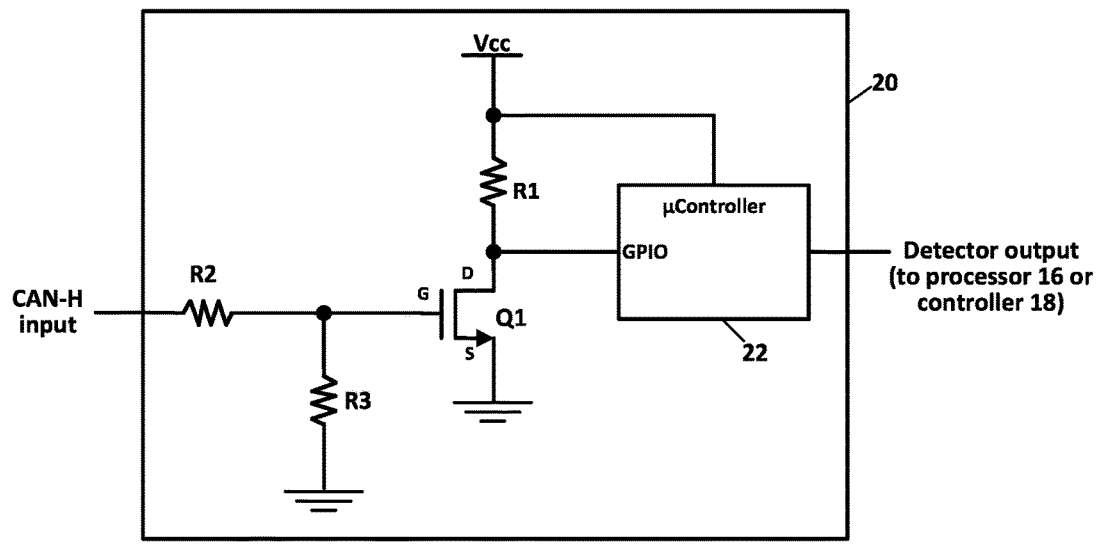
FIG. 4 depicts one embodiment of a detector circuit of an apparatus for monitoring a vehicle communication bus to determine ON/OFF status of the vehicle according to a fourth embodiment.

FIG. 4 depicts an embodiment of the detector 20 that includes an NFET device Q1. The device Q1 generally allows current to flow from its drain D to its source S whenever the voltage on its gate G is above the threshold voltage of the NFET. The device Q1 blocks the current flow otherwise. In a preferred embodiment, the NFET device Q1 has a threshold voltage of about 1V, which is well suited for detecting a CAN-H signal voltage that will be greater than 1V when the CAN bus is powered.

As shown in FIG. 4, the drain D of the device Q1 is connected to a GPIO input of a microcontroller 22. When the CAN-H voltage is below the threshold (i.e. 1V), the device Q1 will not allow any current to flow. In this case, the resistor R1 connected to the voltage source VCC pulls the drain voltage up to VCC, in which case the GPIO input will register as HIGH. When the CAN-H voltage is above the threshold, the device Q1 will allow current to flow from the drain D to the source S. In this case, the current will flow from the source VCC through the resistor R1, through the device Q1 and to ground. This causes the voltage on the drain D to go to a low value, in which case the GPIO input will register as LOW. It should be appreciated that the GPIO input is registering the opposite of the CAN-H signal. In other words, when CAN-H is HIGH, the GPIO input registers LOW, and visa-versa. In a preferred embodiment, software in the microcontroller 22 accounts for this inversion.

The embodiment of FIG. 4 includes a resistor R3 from the gate G of the device Q1 to ground. The purpose of the resistor R3 is to bleed away the voltage on the CAN-H signal when the vehicle is turned off. In some cases when the vehicle is turned OFF, even though the CAN-H voltage is not actively driven to 2V, it may still "float" at a high value unless the R3 resistor bleeds it away. Preferably, the resistor R3 is a relatively high value, such as 1 MΩ, so as not to interfere with the normal CAN bus operation while the vehicle is ON. While inclusion of the resistor R3 in this embodiment is preferred, it is optional.

The embodiment of FIG. 4 includes a resistor R2 between the CAN-H signal input and the gate G of the device Q1. This resistance is preferably a medium value, such as 1 KΩ to 10 KΩ. The resistor R2 is strictly for protection of the device Q1 against any sudden unexpected surge in voltage, such as electrostatic discharge which may occur while handling the detector circuit board, e.g. during installation. While inclusion of the resistor R2 in this embodiment is preferred, it is optional.

Figure 5:
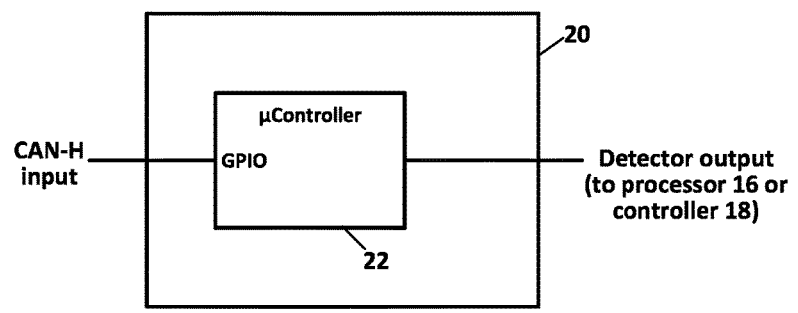
FIG. 5 depicts another embodiment of a detector circuit of an apparatus for monitoring a vehicle communication bus to determine ON/OFF status of the vehicle according to a fifth embodiment.

FIG. 5 depicts an embodiment of the detector 20 that includes a microcontroller 22 having a GPIO input for detecting a HIGH (ON) or LOW (OFF) state of the CAN-H signal. Based on the HIGH or LOW state of the CAN-H signal, the microcontroller 22 turns on or off various hardware components or software components 24 of the device 12, so as to reduce the power consumption when the vehicle is OFF and to return to normal/full power mode when the vehicle is ON.

Figure 6:
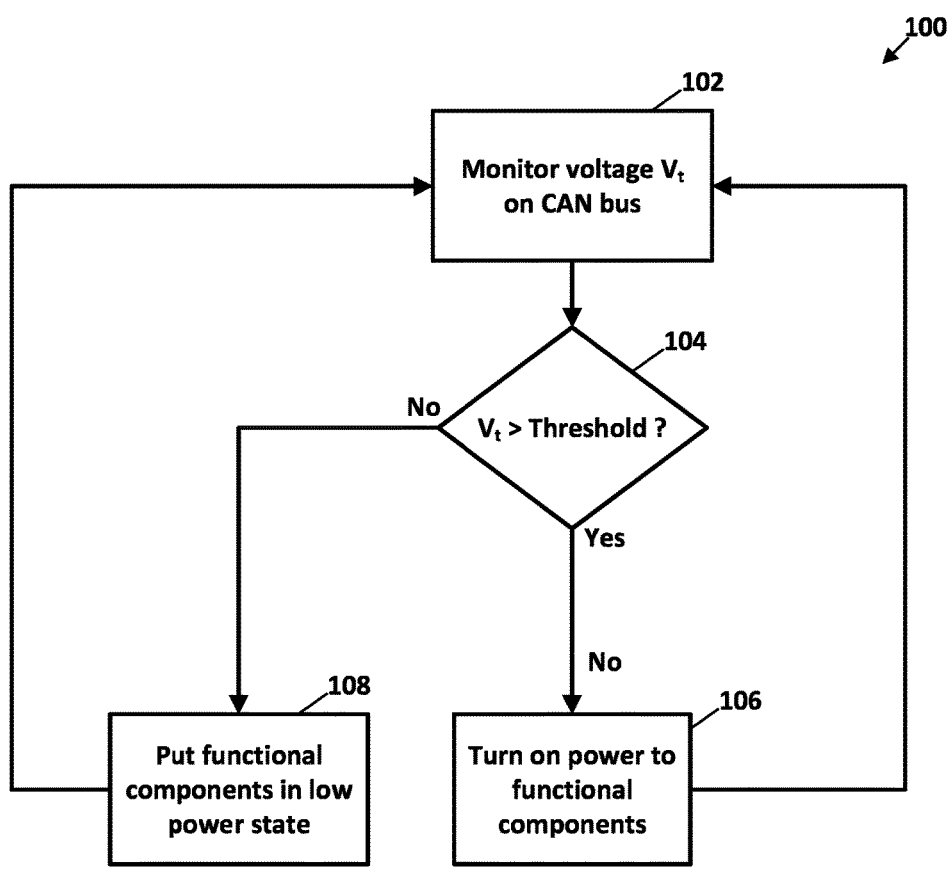
FIG. 6 depicts a method for monitoring a vehicle communication bus to determine ON/OFF status of the vehicle.

Shown in FIG. 6 is a method for monitoring a vehicle's CAN bus to determine the ON/OFF status of the vehicle. Beginning at step 102, the digital processor 16 samples the output voltage $V_t$ of the detector 20 (comparator, ADC, or transceiver) at some specified time interval, such as once-per-second or once-per-minute.

If the processor 16 determines that $V_t$ is greater than a threshold voltage (step 104), the processor 16 turns on power to various hardware or software components 24 of the device 12 (step 106) and continues sampling the output voltage $V_t$ of the detector 20 (step 102). If the processor 16 determines that $V_t$ is less than the threshold voltage (step 104), the processor 16 turns off power to the various hardware or software components 24 of the device 12 (or puts those components in a low-power state)(step 108) and continues sampling the output voltage $V_t$ of the detector 20 (step 102).

In some embodiments in which the detector 20 comprises a comparator (FIG. 1) or an ADC (FIG. 2), the process is essentially as described above, except that the digital processor 16 receives an interrupt when the comparator changes state or when the ADC value crosses a threshold.

In some embodiments in which the detector 20 comprises a comparator (FIG. 1), the output of the comparator may directly connect to a power switch that turns the power on or off to various components 24 in the device 12 to control their power consumption. In this embodiment, the power switch may also control the power provided to the digital processor 16.

While preferred embodiments operate in conjunction with a vehicle's OBD bus, it will be appreciated by those skilled in the art that the various embodiments described herein may also operate in conjunction with other types of vehicle communication networks that carry CAN signals, such as J-BUS.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An apparatus that is operable to electrically connect to a vehicle diagnostic port of a vehicle to receive electrical power therefrom for powering one or more functional components of the apparatus, the apparatus comprising:
   a detector circuit for receiving a Controller Area Network (CAN) signal from the vehicle diagnostic port, comparing the CAN signal to a reference voltage, and generating a detector output signal based on comparison of the CAN signal to the reference voltage; and
   a power controller that receives a power voltage from the vehicle diagnostic port and receives the detector output signal from the detector circuit, the power controller for providing the power voltage to or removing the power voltage from the one or more functional components of the apparatus based on the detector output signal.

2. The apparatus of claim 1 wherein the power controller generates one or more power control signals based on the detector output signal.

3. The apparatus of claim 1 wherein the detector circuit comprises a comparator that receives the CAN signal on a first comparator input, receives a threshold voltage on a second comparator input, and generates the detector output signal based on whether the voltage amplitude of the CAN signal is greater than the threshold voltage.

4. The apparatus of claim 1 wherein:
   the detector circuit comprises an analog-to-digital converter that generates the detector output signal as a digital version of the CAN signal; and
   the power controller generates the one or more power control signals based on whether the digital version of the CAN signal is greater in amplitude than a digital version of a threshold voltage.

5. The apparatus of claim 1 wherein the detector circuit comprises a CAN transceiver that generates the detector output signal as indicating whether or not the Controller Area Network is operational.

6. The apparatus of claim 1 wherein the detector circuit comprises an NFET device having a gate connected to the CAN signal, a drain connected to a supply voltage through a first resistor, and a source connected to ground, wherein a voltage level at the drain depends on the voltage amplitude of the CAN signal at the gate, and wherein the voltage level at the drain comprises the detector output signal.

7. The apparatus of claim 1 wherein the detector circuit comprises:
   an NFET device having a gate connected to the CAN signal, a drain connected to a supply voltage through a first resistor, and a source connected to ground, wherein a voltage level at the drain depends on the voltage amplitude of the CAN signal at the gate; and
   a microcontroller having a General Purpose Input/Output (GPIO) input connected to the drain of the NFET device, the microcontroller for generating the detector output signal based on the voltage level at the drain.

8. The apparatus of claim 1 wherein the detector circuit comprises a microcontroller having a General Purpose Input/Output (GPIO) input connected to the CAN signal, the microcontroller for generating the detector output signal based on a voltage level at the GPIO input.

9. The apparatus of claim 1 comprising a telematics device.

10. An apparatus that is operable to electrically connect to a vehicle diagnostic port of a vehicle to receive electrical power therefrom for powering one or more functional components of the apparatus, the apparatus comprising:
    a detector circuit for receiving a Controller Area Network (CAN) signal from the vehicle diagnostic port;
    a power controller for controlling the electrical power drawn from the vehicle diagnostic port by the one or more functional components of the apparatus based on the CAN signal.

11. The apparatus of claim 10 wherein the detector circuit comprises a comparator that receives the CAN signal on a first comparator input, receives a threshold voltage on a second comparator input, and generates a detector output signal based on whether the voltage amplitude of the CAN signal is greater than the threshold voltage.

12. The apparatus of claim 10 wherein:
    the detector circuit comprises an analog-to-digital converter that generates a detector output signal as a digital version of the CAN signal; and
    the power controller controls the electrical power drawn from the vehicle diagnostic port by the one or more functional components based on whether the digital version of the CAN signal is greater in amplitude than a digital version of a threshold voltage.

13. The apparatus of claim 10 wherein the detector circuit comprises a CAN transceiver that generates a detector output signal as indicating whether or not the Controller Area Network is operational.

14. The apparatus of claim 10 wherein the detector circuit comprises an NFET device having a gate connected to the CAN signal, a drain connected to a supply voltage through a first resistor, and a source connected to ground, wherein a voltage level at the drain depends on the voltage amplitude of the CAN signal at the gate, and wherein the voltage level at the drain comprises a detector output signal.

15. The apparatus of claim 10 wherein the detector circuit comprises:
    an NFET device having a gate connected to the CAN signal, a drain connected to a supply voltage through a first resistor, and a source connected to ground, wherein a voltage level at the drain depends on the voltage amplitude of the CAN signal at the gate; and
    a microcontroller having a General Purpose Input/Output (GPIO) input connected to the drain of the NFET device, the microcontroller for generating a detector output signal based on the voltage level at the drain.

16. The apparatus of claim 10 wherein the detector circuit comprises a microcontroller having a General Purpose Input/Output (GPIO) input connected to the CAN signal, the microcontroller for generating a detector output signal based on a voltage level at the GPIO input.

17. The apparatus of claim 10 comprising a telematics device.

18. A telematics device that is operable to electrically connect to a vehicle diagnostic port of a vehicle to receive electrical power therefrom, the telematics device comprising:
    a detector circuit for receiving a Controller Area Network (CAN) signal from the vehicle diagnostic port and generating a detector output signal based on a voltage amplitude of the CAN signal;

one or more functional components that perform functions of the telematics device when provided with electrical power; and power control means for receiving the electrical power from the vehicle diagnostic port, receiving the detector output signal from the detector circuit, and controlling the electrical power consumed by the one or more functional components based on the detector output signal.

19. The apparatus of claim 18 wherein the one or more functional components comprise one or more of a GPS module, a motion sensor, and a wireless data transceiver.

20. A method for controlling power to one or more functional components of an apparatus that receives power from a vehicle diagnostic port of a vehicle, the method comprising:

(a) monitoring a Controller Area Network (CAN) signal from the vehicle diagnostic port;

(b) comparing a voltage amplitude of the CAN signal to a threshold voltage, wherein the voltage amplitude of the CAN signal comprises an analog voltage value or digital voltage value;

(c) if the voltage amplitude of the CAN signal is greater than the threshold voltage, providing power or increasing power to the one or more functional components; and (d) if the voltage amplitude of the CAN signal is less than the threshold voltage, removing power or reducing power to the one or more functional components.

21. The method of claim 20 wherein the apparatus comprises a telematics device.

* * * * *